United States Patent Office 2,878,167
Patented Mar. 17, 1959

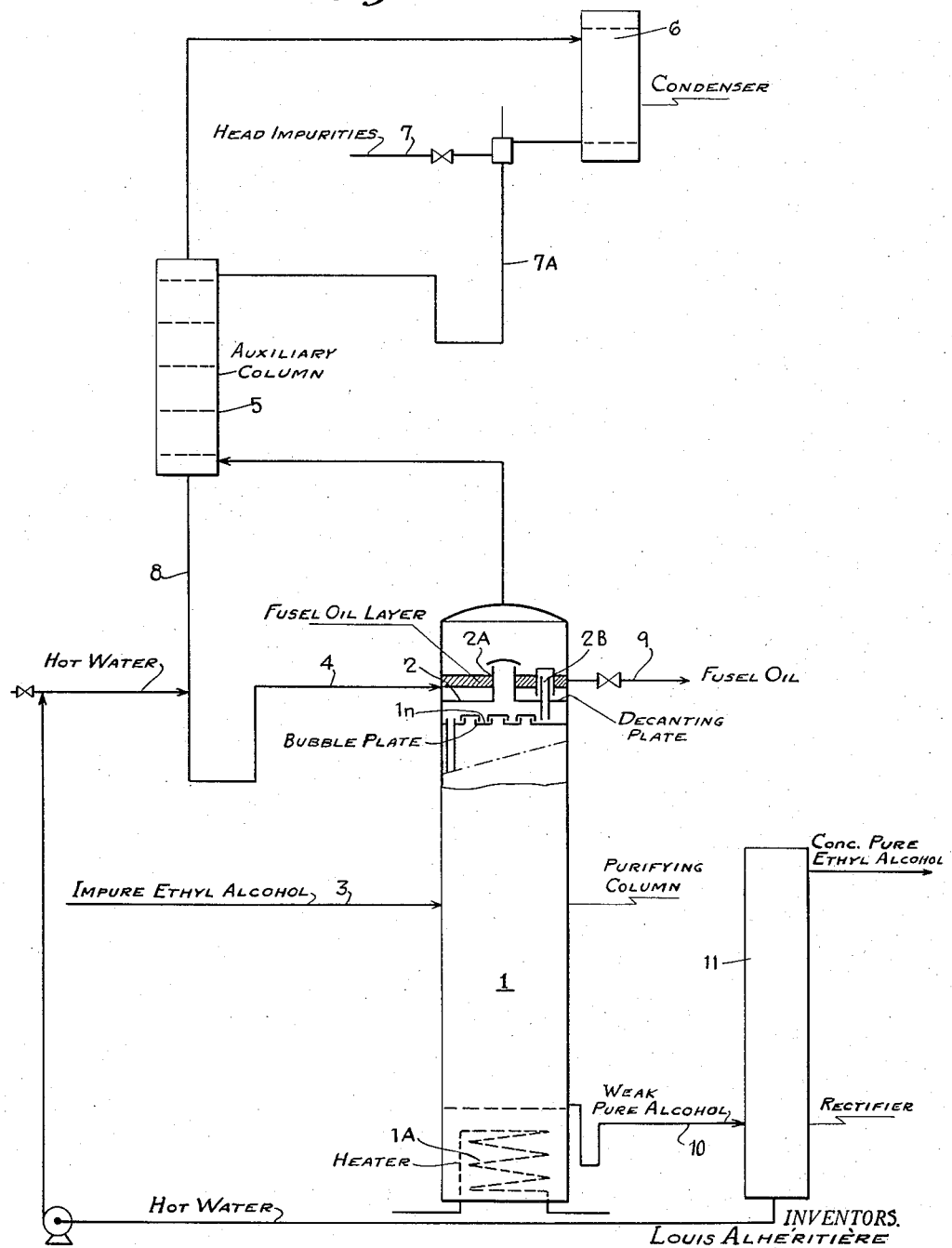

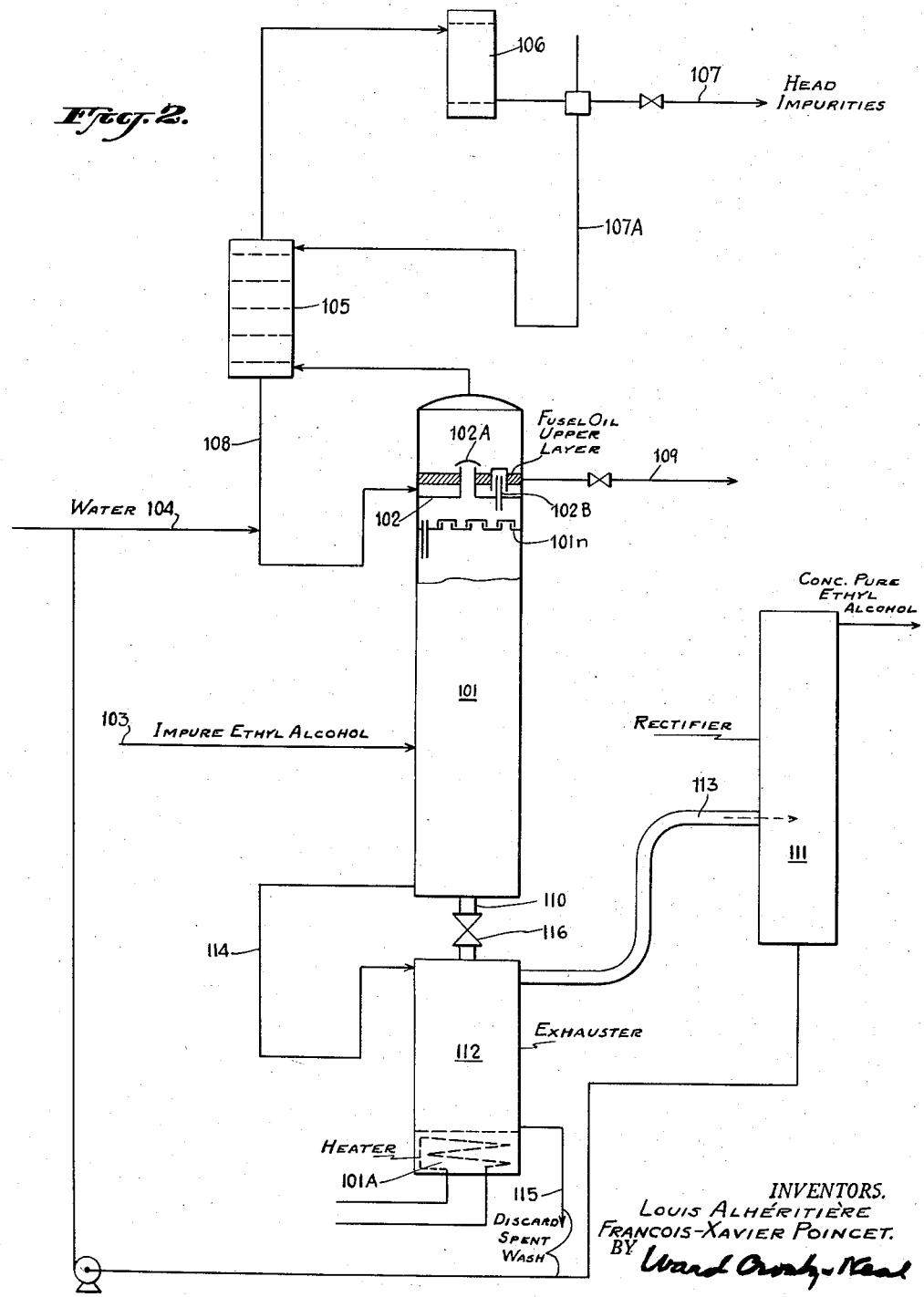

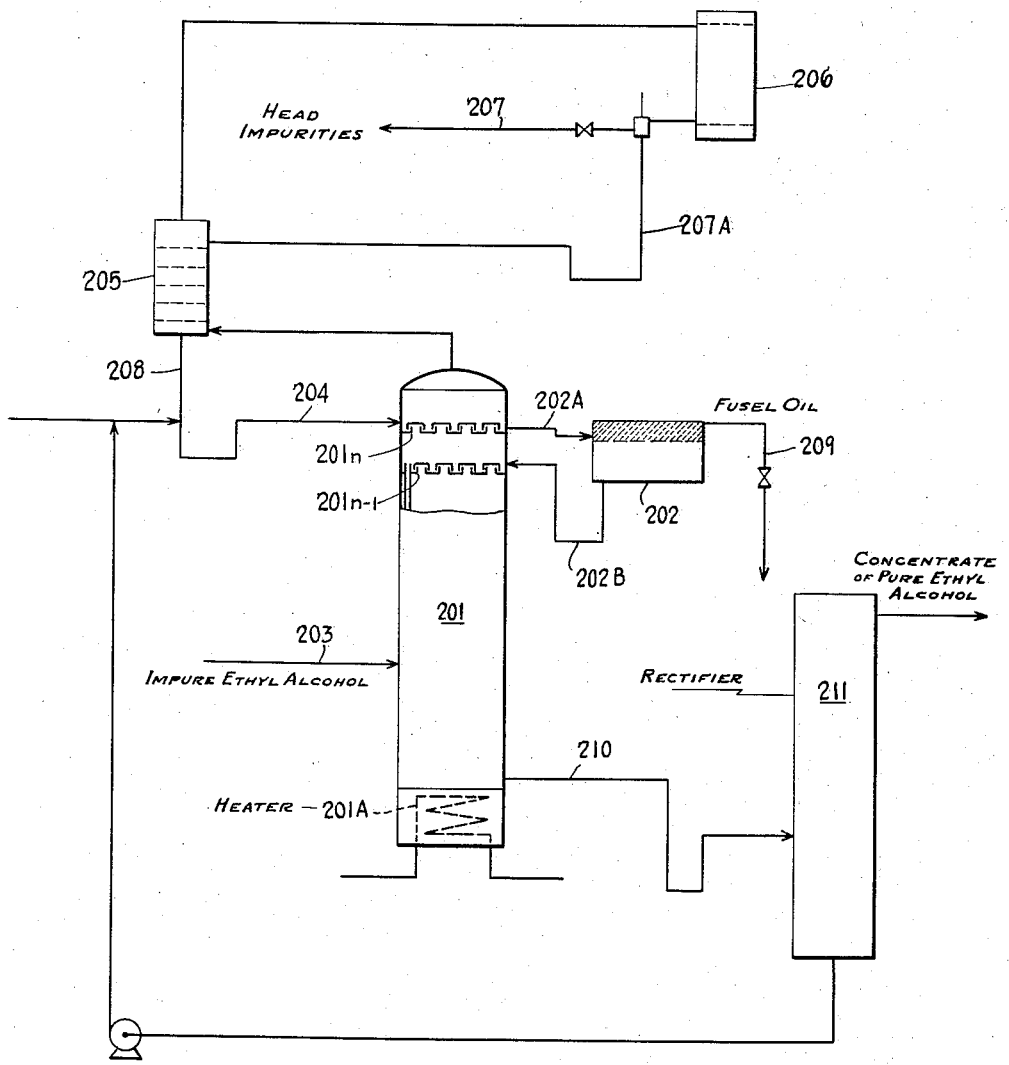

2,878,167

MANUFACTURE OF HIGHLY PURE ETHYL ALCOHOL

Louis Alhéritière, Melle, and François-Xavier Poincet, Paris, France, assignors to Les Usines de Melle (Societe Anonyme), Saint-Leger-les-Melle, France, a corporation of France Application October 8, 1953, Serial No. 384,832

Claims priority, application France November 25, 1952

4 Claims. (Cl. 202—40)

This invention relates to a process for the manufacture of highly pure ethyl alcohol and by-products from impure ethyl alcohol.

Processes have been devised heretofore for the manufacture of purified alcohol by distilling ethyl alcohol in a purifying column while feeding hot water into the top of the column, withdrawing impurities from the top of the column and refluxing some of the impurities thereinto, maintaining a proportion of water in the column to prevent substantially ethyl alcohol from passing to the top of the column with the impurities and recovering the purified dilute alcohol from the bottom of the column. In such processes, however, although the dilution of the ethyl alcohol prevents a large proportion of this alcohol from rising to the top of the column with the impurities, nevertheless significant amounts of ethyl alcohol pass off in this manner and are practically lost.

The principal object of the present invention accordingly is to provide a simple and efficient process for purifying fermentation ethyl alcohol which contains fusel oil and other fermentation impurities to recover highly pure ethyl alcohol and separately recover the fusel oil from the other impurities. Another object is to provide a process of this kind in which the loss of ethyl alcohol shall be minimized.

The invention accordingly consists of the novel processes and steps of processes, specific embodiments of which are described hereinafter by way of example and in accordance with which we now prefer to practice the invention.

In carrying out our process we continuously feed into the mid-section of a purifying column an impure fermentation ethyl alcohol containing fusel oil and other water-miscible impurities, some of which have water azeotropes boiling close to the water azeotrope of ethyl alcohol. We maintain the water content in the purifying column such that the ethyl alcohol concentration therein is not above about 20% by weight. We heat the purifying column to drive the fusel oil and other impurities to the top of the column and collect the oily material as a liquid in a quiescent zone at the top of the column. Hot water is introduced into the fusel oil mixture in said quiescent zone to cause it to separate into an upper oily layer which is removed and a lower aqueous layer which is refluxed to the top bubble-plate of the column. Head vapors are distilled to separate head impurities therefrom and these are discarded or else treated to recover portions thereof, the bottom products from this distillation being returned to the quiescent zone. The highly pure alcohol is removed from the base of the purifying column as a dilute aqueous ethyl alcohol solution. This may be then rectified to produce a concentrated alcohol.

The expression "fusel oil" as used in the specification and appended claims is intended to designate a mixture, the composition of which is as follows:

$C_5$ alcohols between 50–85% by weight
$C_3+C_4$ alcohols between 10–30% by weight
Mixure of esters and acids between 2–10% by weight The $C_5$ alcohols mixture consists of isoamyl alcohol, 70–80% by weight, and 2-methyl 1-butanol, 20–30% by weight of the total $C_5$ alcohols.

The $C_3+C_4$ alcohols mixture consists of propyl and isobutyl alcohols. The proportion of each of them may be between 20–80% by weight of the total $C_3+C_4$ alcohols.

The mixture of esters and acids consists substantially wholly of esters. There are only traces of free acidity. The ester mixture contains very small proportions of ethyl acetate, the remainder consisting of propyl, butyl and amyl esters of higher aliphatic acids of molecular weights between 150–250, boiling between 100–200° C. under a pressure of 25 mm. mercury.

In the accompanying drawings forming part of this specification we show an apparatus which may be employed for carrying out our invention. In these drawings:

Fig. 1 represents a diagrammatic elevation of apparatus suitable for treating impure fermentation ethyl alcohol having a relatively high content of ethyl alcohol, Fig. 2 is a similar diagrammatic elevation of an apparatus for treating dilute impure aqueous fermentation ethyl alcoholic solutions, such as worts from alcoholic fermentations, and Fig. 3 shows a modification of the apparatus of Fig. 1.

In the apparatus of Fig. 1, 1 is the purifying column to which the impure alcoholic liquid to be purified is fed through pipe 3 and in which column the impure alcohol is continuously distilled. Column 1 is a distilling column heated by heater 1A to drive the fusel oil mixture and other impurities to the top and provided with bubble plates such as 1n. The top plate 2 of the column is a decanting plate which has no bubbling or other liquid-vapor contact-promoting device but is traversed by an open chimney 2A through which the vapors rising from the top bubble-plate 1n pass freely. Thus a quiescent zone for the liquid fusel oil mixture is provided on plate 2. Sufficient hot water so that the ethyl alcohol concentration in the liquid in the column is not above 20% by weight, is supplied to said zone through pipe 4 causing decantation of the liquid on plate 2. The upper layer from the decantation, consisting of fusel oil, is removed through pipe 9 while the lower layer flows on to plate 1n through an overflow 2B. The vapors issuing from the top of column 1 pass to auxiliary column 5 in which they are distilled. Head impurities from the top of column 5 are condensed in condenser 6 and partly withdrawn through pipe 7, partly refluxed to column 5 through pipe 7A. The bottoms from column 5 are returned on to plate 2 through pipes 8 and 4.

The weak aqueous solution of purified ethyl alcohol flowing from the foot of column 1 through pipe 10 is sent to a rectifier 11 in which it is concentrated and the last traces of impurities, if any, removed. The concentrated pure alcohol is obtained from the head of rectifier 11. The hot water forming the bottoms of the rectification is preferably recycled to the top of column 1 as a water supply to plate 2.

Similarly in the apparatus of Fig. 2, 101 is the purifying column. The impure alcoholic feed is introduced through pipe 103. Column 101 has bubble-plates such as 101n and a top decanting plate 102 provided with an open chimney 102A and an overflow 102B for the lower layer being a dilute impure solution containing some of the constituents of the fusel oil mixture, the upper layer, fusel oil mixture being withdrawn through pipe 109. Water through pipe 104 is supplied at a rate to maintain an ethyl alcohol content of not over 20% by weight in the column 101. The auxiliary column, condenser, head impurities withdrawing pipe, head impurities refluxing pipe and bottoms refluxing pipe are designated by 105, 106, 107, 107A and 108 respectively. Purified alcoholic solution flowing from the base of column 101 through pipe 114 is introduced into an exhausting section 112 heated by heater 101A and in which a portion of the water is separated from the alcoholic product and discarded through pipe 115. A portion of the vapors leaving the top of section 112 is delivered to the base of column 101 through pipe 110 fitted with a flow control valve 116, to heat column 101. The remainder of the vapors is removed through 113 and fed to rectifier 111 operated as rectifier 11 of Fig. 1. Spent wash from the rectifier is preferably taken to be recycled as a water feed to column 101 through pipe 104.

The quiescent zone may be arranged outside the column. Such a disposition is shown in Fig. 3 where substantially the same apparatus elements as in Fig. 1 are present. The difference is that the top plate of the purifying column (201) is a bubble-plate $201n$ which has bubble-caps but no overflow so that the liquid—comprising water—that arrives on to that plate collects thereon instead of refluxing down throughout the column. The liquid so accumulating on plate $201n$ continuously passes through pipe 202A into external, heat-insulated decanting device 202 constituting the quiescent zone. The liquid there separates into two layers. The upper layer is withdrawn through pipe 209 while the lower layer is returned to the column on to the plate $201n-1$ just beneath the top plate, as a water feed and reflux.

The following are examples of the manner in which we now prefer to practice the process of our invention. These examples are illustrative of such process and the process is not to be considered as restricted thereto except as indicated in the appended claims. All percentages are by weight.

Example 1.—1250 kg. per hour of impure alcoholic liquid are continuously introduced through pipe 3 (Fig. 1) into column 1. This alcohol was obtained by fermentation of beet molasses and had the following composition:

| | Percent |
|---|---|
| Impure alcohol | 80.4 |
| Water | 19.6 |

The composition of said impure alcohol was as follows:

| | Percent |
|---|---|
| Ethyl alcohol | 99.45 |
| Fusel oil | 0.3 |
| Aldehydes | 0.15 |
| Light esters | 0.1 |

The fusel oil consisted of 80% of $C_5$ alcohols (comprising about three times as much isoamyl alcohol as methylbutanol), 16% of $C_3+C_4$ alcohols (comprising about four times as much propyl alcohol as isobutyl alcohol) and 4% of an acid mixture of high boiling esters. The aldehydes comprised mainly acetaldehyde (90%) and a minor proportion (10%) of $C_3-C_5$ aldehydes. The light esters comprised manly ethyl acetate (78%) and a minor proportion (22%) of a mixture of isobutyl and isoamyl acetates.

The liquid as stated was introduced through pipe 3 into the purifying column of Fig. 1 having 50 bubble-plates and there distilled. The apparatus was operated as described above. 8000 liters per hour of hot water having a temperature of about 100° C. were fed to column 1 through pipe 4. The vapors leaving the top of column 1 were introduced into the lower part of auxiliary column 5 having 5 plates. We withdrew through pipe 7 2.9 kg. per hour of head impurities having the following composition:

| | Kg. |
|---|---|
| Aldehydes | 1.5 |
| Light esters | 1 |
| Ethyl alcohol | 0.3 |
| Water | 0.1 |

The remainder of the condensate was refluxed to the top of column 5.

The upper layer consisting of fusel oil product forming on plate 2 was withdrawn through pipe 9 at a rate of 3.7 kg. per hour containing 3 kg. of fusel oil, 0.3 kg. of ethyl alcohol and 0.4 kg. of water. The weak pure aqueous ethyl alcohol solution flowing from the base of column 1 through pipe 10 was concentrated in rectifier 11 up to a strength of 96.5% by volume and the last traces of impurities removed therefrom.

The total amount of ethyl alcohol withdrawn with the impurities was 0.6 kg. only, the yield of highly pure ethyl alcohol thus being 99.94%.

Example 2.—We operated as described in Example 1. 1111 kg. per hour of an impure alcoholic liquid obtained from fermentation of corn were employed. This liquid had the following composition:

| | Percent |
|---|---|
| Impure alcohol | 91.24 |
| Water | 8.76 |

The composition of said impure alcohol was as follows:

| | Percent |
|---|---|
| Ethyl alcohol | 98.65 |
| Fusel oil | 1.03 |
| Aldehydes | 0.075 |
| Light esters | 0.245 |

The fusel oil consisted of 78% of $C_5$ alcohols (comprising about three times as much isoamyl alcohol as methylbutanol), 19% of $C_3+C_4$ alcohols (comprising about 45% of propyl alcohol and 55% of isobutyl alcohol) and 3% of acid mixture of high boiling esters. The aldehydes comprised approximately 90% of acetaldehyde and 10% of $C_3-C_5$ aldehydes. The light esters comprised roughly 80% of ethyl acetate and 20% of higher alkyl acetates.

This impure alcoholic liquid was introduced at the rate indicated through pipe 3 and 11,500 liters per hour of water at a temperature of about 100° C. were fed on to decanting plate 2. The amount of head impurities withdrawn through pipe 7 was 4 kg. per hour containing:

| | Kg. |
|---|---|
| Aldehydes | 0.8 |
| Light esters | 2.5 |
| Ethyl alcohol | 0.4 |
| Water | 0.3 |

The amount of fusel oil product withdrawn through pipe 9 was 12 kg. per hour containing:

| | Kg. |
|---|---|
| Fusel oil | 10.4 |
| Ethyl alcohol | 0.6 |
| Water | 1 |

Thus the total amount of alcohol withdrawn with the impurities was 1 kg. only, the yield thus amounting to 99.9% of highly pure ethyl alcohol.

It should be noted that the above examples relate to the purification of impure alcoholic liquids of high alcoholic strength. Our invention, however, also permits purification of very dilute alcoholic liquids, such as fermented alcoholic worts. This is illustrated by the following example:

Example 3.—30,000 kg. per hour of wort from alcoholic fermentation of beet molasses having the following composition were employed:

| | Percent |
|---|---|
| Impure alcohol | 5.06 |
| Water | 94.94 |

The composition of the impure alcohol was as follows:

| | Percent |
|---|---|
| Ethyl alcohol | 98.78 |
| Fusel oil | 0.95 |
| Aldehydes | 0.026 |
| Light esters | 0.244 |

The fusel oil consisted of 76% of $C_5$ alcohols (comprising about three times as much isoamyl alcohol as methylbutanol), 21% of $C_3 + C_4$ alcohols (comprising about four times as much propyl alcohol as isobutyl alcohol) and 3% of acid mixture of high boiling esters. The aldehydes comprised approximately 92% of acetaldehyde and 8% of $C_3-C_5$ aldehydes. The light esters comprised roughly 80% of ethyl acetate and 20% of higher alkyl acetates.

This wort was introduced at the rate indicated through pipe 103 into the mid-section of the purifying column 101 (Fig. 2). 3200 kg. per hour of hot water having a temperature of about 100° C. were introduced through pipe 104 onto decanting plate 102. The apparatus was operated as given above in describing the operation of the apparatus of Fig. 2.

We withdrew through pipe 107 6 kg. per hour of head impurities having the following composition:

| | Kg. |
|---|---|
| Aldehydes | 0.4 |
| Esters | 3.6 |
| Ethyl alcohol | 1.6 |
| Water | 0.4 |

We also withdrew through pipe 109 18 kg. per hour of oils having the following composition:

| | Kg. |
|---|---|
| Fusel oil | 14.5 |
| Ethyl alcohol | 2 |
| Water | 1.5 |

The total amount of alcohol withdrawn with the impurities was 3.6 kg. only, thus the yield was 99.8%.

The expression "highly pure alcohol" as used herein is intended to designate an alcohol having less than 0.005% of impurities and which is entirely free from malodorous and bad-tasting ingredients.

The process includes the following advantages. Since the hot water is fed to the decanting device itself, the amount of ethyl alcohol withdrawn with the fusel oils is practically negligible, because the alcohol content is balanced between the fusel oil and the aqueous layer, the organic content of which is maintained at or below 10% by volume, preferably 4–5% by volume, by suitably controlling the water feed, so that the fusel oil contains only a few percent of alcohol. A further advantage is that the decantation performed in accordance with this invention takes place very easily and with high efficiency.

Furthermore, distillation in an auxiliary column of the vapors from the top of the purifying column results in a very efficient separation of the head impurities from the alcohol because the head impurities are much more capable to remain as vapors in the auxiliary column than alcohol. Accordingly, highly concentrated head impurities collect in the head of the auxiliary column, and as the amount of heads to be discarded therefrom is very small, the loss of alcohol by such discarding is as low as possible.

As the two kinds of impurities as withdrawn (viz., fusel oil material and head impurities) contain but a very small quantity of ethyl alcohol, we obtain pure ethyl alcohol yields above 99.5%.

In addition the separate recovery in highly concentrated state, on the one hand of the fusel oil material and on the other hand of the head impurities, is important.

As a modification of the process of our invention we cool the oils withdrawn as an upper layer from the decanting plate of the purifying column and subject them to a further decantation, in the cold, for separating therefrom the small quantity of water they contain, which water is then returned to the purifying column.

We also point out that we may replace the auxiliary column 5 (or 105 or 205 respectively) by a section having the same number of plates and which is superimposed directly on the purifying column.

What we claim is:

1. The continuous process which comprises feeding into the mid-section of a purifying column an impure aqueous fermentation ethyl alcoholic liquid, heating said purifying column to drive the fusel oil and other impurities to the top of the column, collecting impure aqueous fusel oil on a plate inside the top of said column, introducing hot water into said impure fusel oil on said plate in sufficient amount to maintain the ethyl alcohol concentration in the column at not above about 20% by weight, causing the impure aqueous fusel oil to separate into an upper layer mainly composed of fusel oil and a lower aqueous layer containing impurities, decanting the so-treated impure fusel oil while quiescent, withdrawing said fusel oil, refluxing the aqueous layer to the top part of the column, distilling vapors contained above the level of said plate to separate therefrom head impurities and discarding same, returning the bottom products to the top of said column, and removing purified ethyl alcohol from the base of the purifying column.

2. A process in accordance with claim 1 in which the organic content of the lower aqueous layer formed in the quiescent zone is not over about 10% by volume.

3. A process in accordance with claim 1, in which the liquid collected on said plate is maintained in a quiescent state and is decanted while on said plate.

4. The continuous process which comprises feeding into the mid-section of a purifying column an impure aqueous fermentation ethyl alcoholic liquid, heating said purifying column to drive the fusel oil and other impurities to the top of the column, collecting impure aqueous fusel oil on a plate inside the top of said column, introducing hot water into said impure fusel oil on said plate in sufficient amount to maintain the ethyl alcohol concentration in the column at not above about 20% by weight, withdrawing the liquid collected on said plate to a point outside of the column and causing the impure aqueous fuel oil to separate into an upper layer mainly composed of fusel oil and a lower aqueous layer containing impurities, decanting the so-treated impure fusel oil while quiescent, withdrawing said fusel oil, refluxing the aqueous layer to the top part of the column, distilling vapors contained above the level of said plate to separate therefrom head impurities and discarding same, returning the bottom products to the top of said column, and removing purified ethyl alcohol from the base of the purifying column.

References Cited in the file of this patent

UNITED STATES PATENTS

| | | |
|---|---|---|
| 996,328 | Guillaume | June 27, 1911 |
| 1,929,901 | Ricard et al. | Oct. 10, 1933 |
| 1,986,431 | Gray | Jan. 1, 1935 |
| 2,080,111 | Bump | May 11, 1937 |
| 2,551,593 | Gilliland et al. | May 8, 1951 |
| 2,591,671 | Catterall | Apr. 8, 1952 |
| 2,610,141 | Drout | Sept. 9, 1952 |
| 2,612,467 | Morrell et al. | Sept. 30, 1952 |

FOREIGN PATENTS

| | | |
|---|---|---|
| 515,025 | Great Britain | July 1, 1939 |